No. 861,172. PATENTED JULY 23, 1907.
T. J. GRAY.
CRUSHING MACHINERY.
APPLICATION FILED MAY 21, 1904.

WITNESSES:

INVENTOR
Thomas J. Gray
BY
Buckley + Durand
ATTORNEYS

THE NORRIS PETERS CO., WASHINGTON, D. C.

No. 861,172. PATENTED JULY 23, 1907.
T. J. GRAY.
CRUSHING MACHINERY.
APPLICATION FILED MAY 21, 1904.

WITNESSES:

INVENTOR
Thomas J. Gray
BY
Bulkley & Durand
ATTORNEYS

No. 861,172. PATENTED JULY 23, 1907.
T. J. GRAY.
CRUSHING MACHINERY.
APPLICATION FILED MAY 21, 1904.
8 SHEETS—SHEET 4.

WITNESSES:
INVENTOR
Thomas J. Gray
BY
Buckley & Durand
ATTORNEYS

No. 861,172. PATENTED JULY 23, 1907.
T. J. GRAY.
CRUSHING MACHINERY.
APPLICATION FILED MAY 21, 1904.

WITNESSES:
INVENTOR
Thomas J. Gray
BY
ATTORNEYS

THE NORRIS PETERS CO., WASHINGTON, D. C.

No. 861,172. PATENTED JULY 23, 1907.
T. J. GRAY.
CRUSHING MACHINERY.
APPLICATION FILED MAY 21, 1904.

WITNESSES:

INVENTOR
Thomas J. Gray
BY
Buckley & Durand
ATTORNEYS

No. 861,172.

PATENTED JULY 23, 1907.

T. J. GRAY.
CRUSHING MACHINERY.
APPLICATION FILED MAY 21, 1904.

WITNESSES:

INVENTOR
Thomas J. Gray
BY
Bulkley & Durand
ATTORNEYS

No. 861,172. PATENTED JULY 23, 1907.
T. J. GRAY.
CRUSHING MACHINERY.
APPLICATION FILED MAY 21, 1904.

WITNESSES:
JB Weir
Emil Wettmann

INVENTOR
Thomas J. Gray
BY
Bulkley + Durand
ATTORNEYS

UNITED STATES PATENT OFFICE.

THOMAS J. GRAY, OF CHICAGO, ILLINOIS, ASSIGNOR, BY MESNE ASSIGNMENTS, TO INDIANA ROAD MACHINE COMPANY, OF FORT WAYNE, INDIANA, A CORPORATION OF INDIANA.

CRUSHING MACHINERY.

No. 861,172.     Specification of Letters Patent.     Patented July 23, 1907.

Application filed May 21, 1904. Serial No. 209,041.

*To all whom it may concern:*

Be it known that I, THOMAS J. GRAY, a citizen of the United States of America, and a resident of Chicago, Cook county, Illinois, have invented a certain new and useful Improvement in Crushing Machinery, of which the following is a specification.

The elevating apparatus herein shown and described is claimed broadly in my copending application No. 223,937, and is only claimed in combination with certain features of the crusher in this application.

My invention relates to crushing machines of that particular type in which the crushing hopper is formed by a couple of oppositely arranged jaws whereof at least one is mounted for more or less rapid movement toward and away from the other.

Generally stated, the object of my invention is the provision of a highly efficient crushing machine of the foregoing character.

Certain special objects are to provide an improved arrangement whereby only rocks of a certain size may be forced into contact with the jaws; to provide improved means for regulating the throat of the hopper, so as to permit the size of the product to be changed at will, the arrangement for so doing consisting preferably of an eccentric device for moving the lower end of the stationary jaw toward and away from the vibratory or movable jaw; to provide an improved vibratory spout for receiving the product from the throat or lower end of the hopper formed between the two jaws; to obtain a forward-and-back movement of the movable jaw, slightly less at the top than at the bottom, by arranging all of the bearings or pivotal points of the pitman or vertical lever in line with each other, or practically so; to improve and reduce the weight of the machine, and retain the maximum strength by employing steel plates and castings in an effective and highly efficient manner; to facilitate the manipulation of the elevator in changing it from an inclined or working position to a horizontal position, as is necessary for convenience of transportation, by locating the pivotal point at or near the center of gravity of the elevator; and to provide certain details and features of improvement tending to increase the efficiency and serviceability of a crushing machine of this particular character.

To the attainment of the foregoing and other useful ends my invention consists in matters hereinafter set forth and claimed.

In the accompanying drawings.

Figure 1:
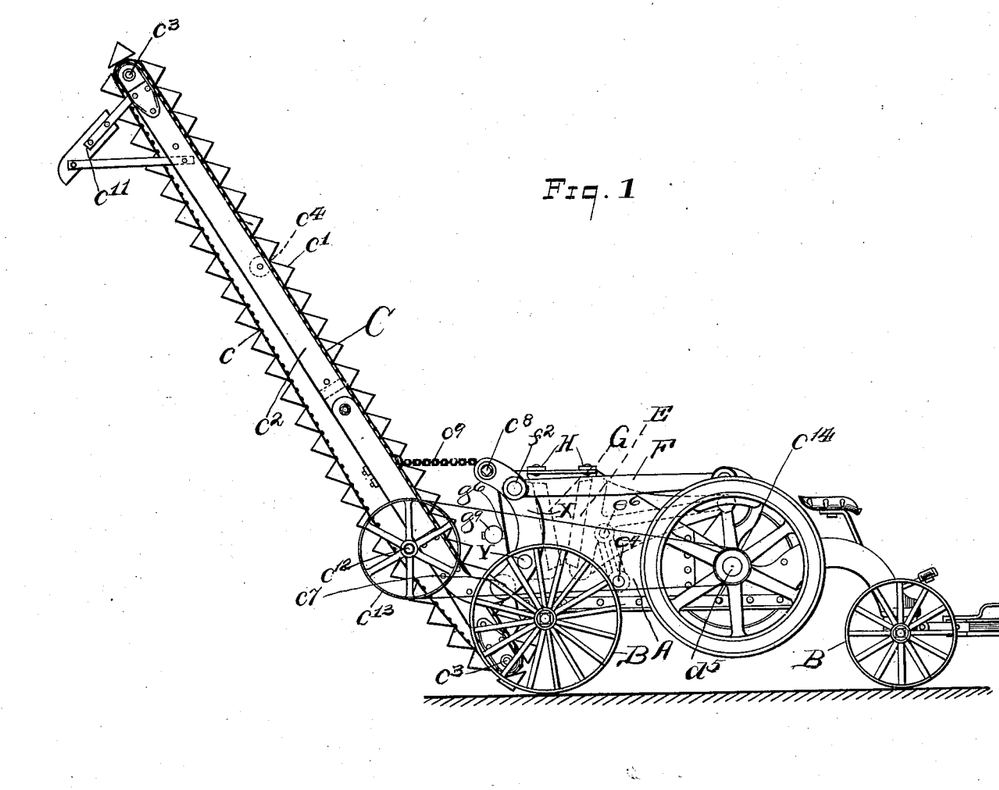
Figure 1 is a side elevation of my improved crushing machine, showing the elevator in a raised or working position.
Figure 2:
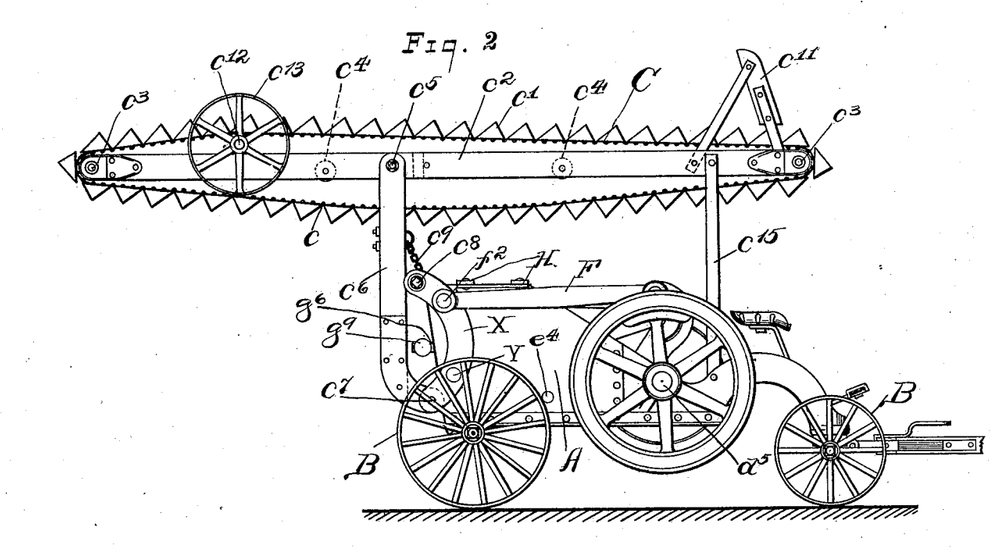
Fig. 2 is a view similar to Fig. 1, but showing the elevator lowered or folded into a horizontal position.

As thus illustrated, and referring more particularly to Figs. 1 and 2, it will be seen that my improved crushing machine comprises a body-frame A, preferably mounted upon vehicle wheels B, so as to adapt the machine for transportation. Also, as shown in Figs. 1 and 2, the machine is provided with an elevator C, which may comprise sprocket-chains or belts $c$ provided with buckets $c^1$ of any suitable or desired character. Preferably, however, said elevator is constructed with a frame or body $c^2$, provided with rotary end members $c^3$ over which the conveyer-belt runs, and also with intermediate rolls $c^4$, the latter preventing the upper or loaded portion of the conveyer from sagging through the frame. This frame or body $c^2$ of the elevator is pivoted at $c^5$ to a couple of swinging arms $c^6$, the latter being pivoted to opposite sides of the body frame at $c^7$. A horizontally disposed drum or winding shaft $c^8$ can be mounted upon the body frame of the machine in any suitable or desired manner, and is connected with the arm $c^6$ by chains or other like flexible connections $c^9$. A ratchet device $c^{10}$, of any suitable character, is provided and employed as the means for preventing the rotation of the drum or shaft $c^8$ after the chains are wound up for the purpose of bringing the arms $c^6$ into the position shown in Fig. 2. The upper end of the elevator body may be provided with a suitable spout $c^{11}$, adapted to receive the product or crushed rock from the upper end of the conveyer-belt. The back or under side of the elevator frame can be provided with bearings of any suitable character, adapted to support a horizontally disposed shaft $c^{12}$. As illustrated, this shaft is provided with a belt pulley $c^{13}$, adapted to have belt connection with the smaller pulley $c^{14}$ on the main shaft of the machine. With this arrangement, the shaft $c^{12}$ can be connected in any suitable manner for driving the conveyer belt of the elevator. It will be observed at this juncture that the pivotal point $c^5$ about which the elevator is free to tilt is located near the longitudinal center of the elevator. Furthermore, it will be seen that the shaft $c^{12}$ is so positioned as to act as a stop to limit the relative swing between the elevator and the supporting arm $c^6$ in one direction. Consequently, when the chains $c^9$ are wound in, and the arm $c^6$ adjusted to a substantially vertical position, the elevator is then in condition to have its upper end tilted downward with very little exertion. In fact, with the pivotal point of the elevator arranged substantially at or near the center of gravity, it is only necessary to start the elevator over in the direction desired, and it then falls slowly by its own weight to a horizontal position, as shown in Fig. 2. In this position, the elevator can be supported for transportation by braces or props $c^{15}$ having their upper ends pivoted to the elevator frame and their lower ends similarly connected with the body-frame of the crusher. Thus, with the construction shown, it is apparent that I provide my improved crushing machine with an elevator which may be very easily manipulated for the purpose of raising it to a working position or lowering it to a horizontal or transporting position.

Figure 3:
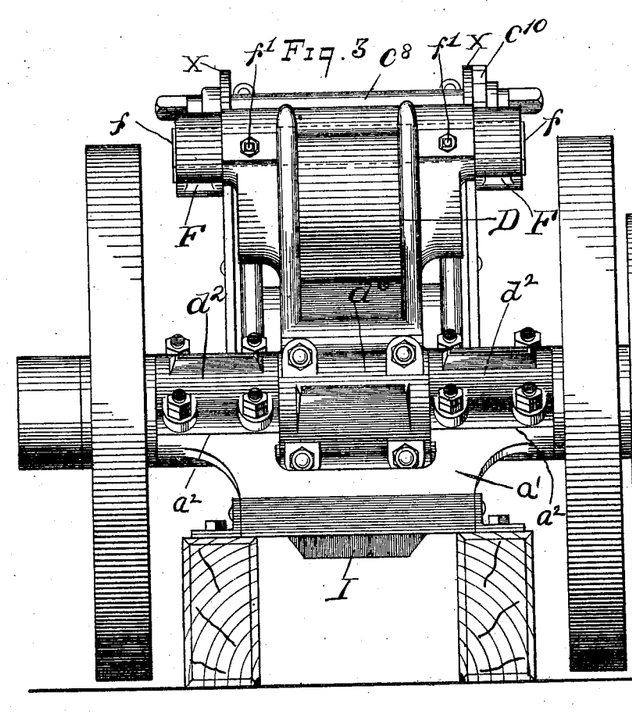
Fig. 3 is a front end elevation of the machine shown in Fig. 1.
Figure 4:
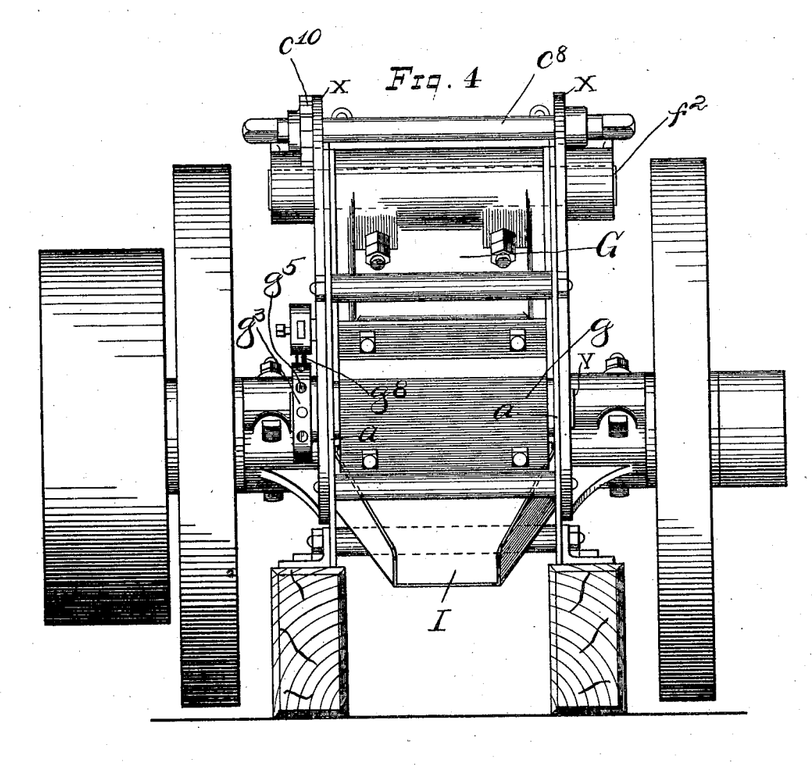
Fig. 4 is a rear end elevation of the machine shown in Fig. 1.
Figure 5:
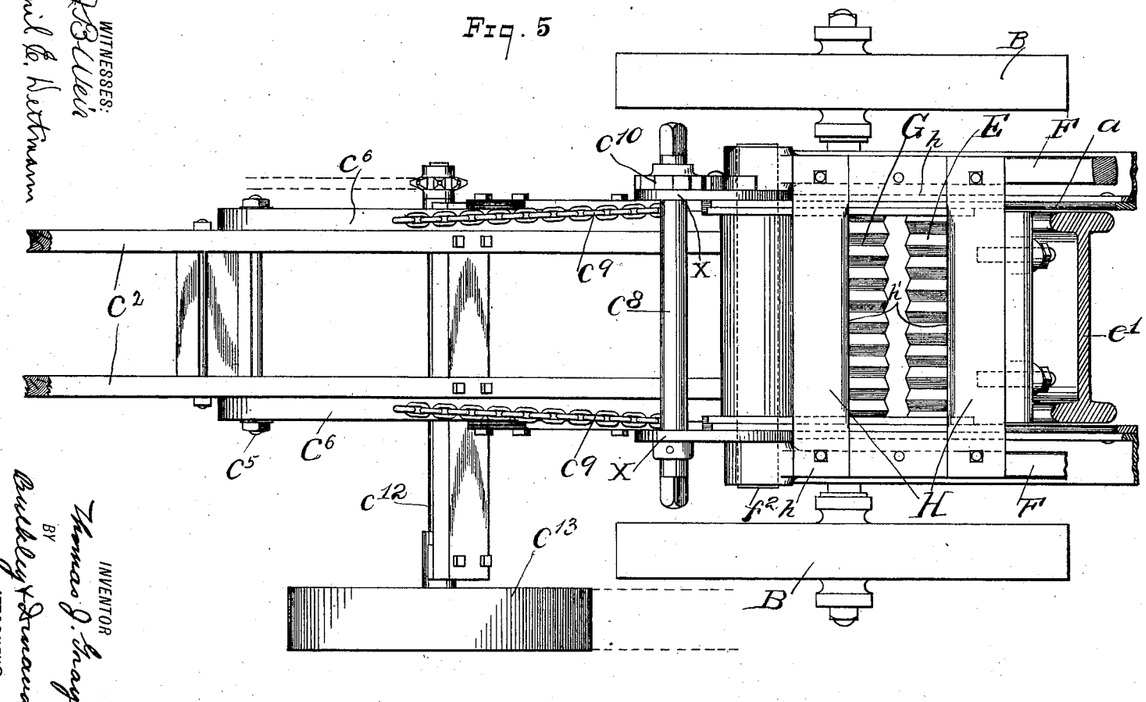
Fig. 5 is a partial plan of the machine shown in Fig. 1.
Figure 6:
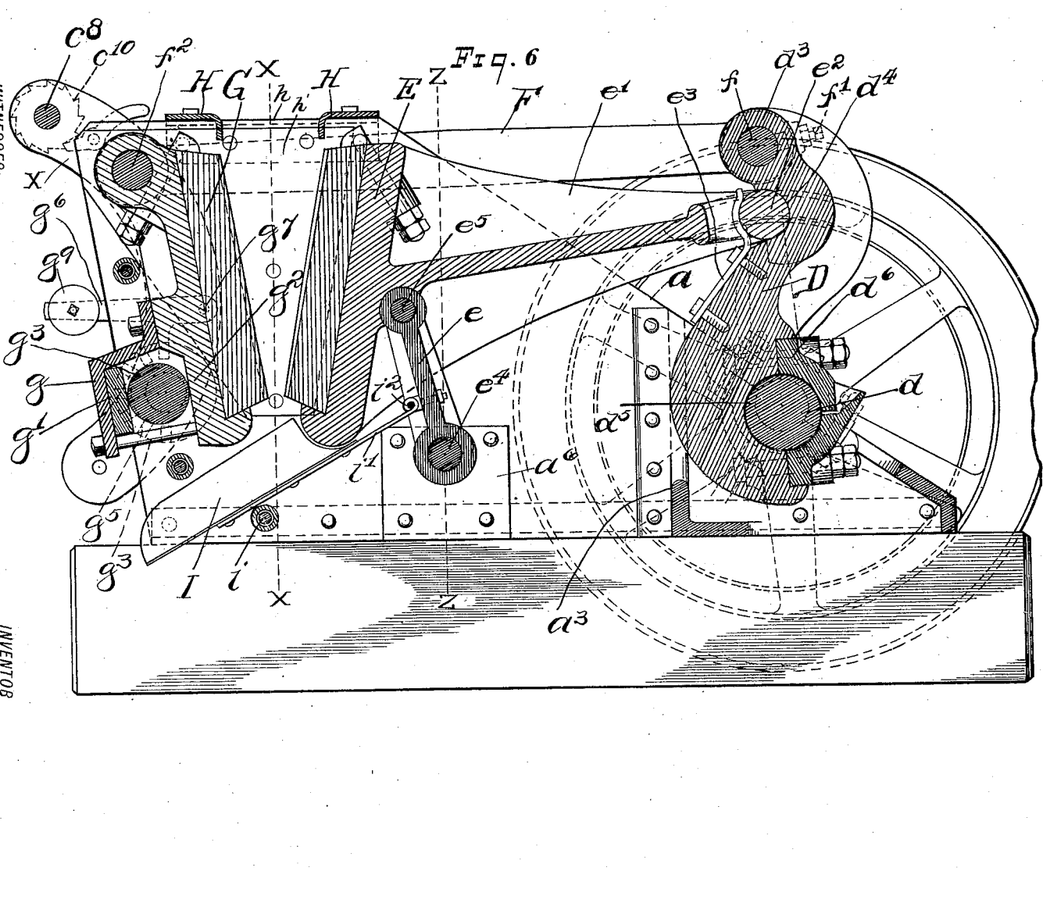
Fig. 6 is a vertical or longitudinal section of my improved crushing machine, the elevator and vehicle wheels being omitted for convenience of illustration.
Figure 7:
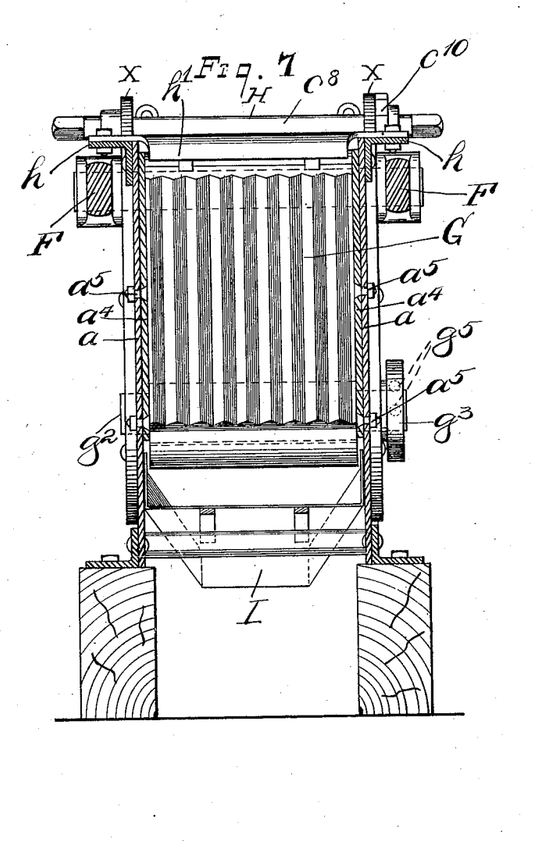
Fig. 7 is a cross-section on line X—X in Fig. 6.
Figure 8:
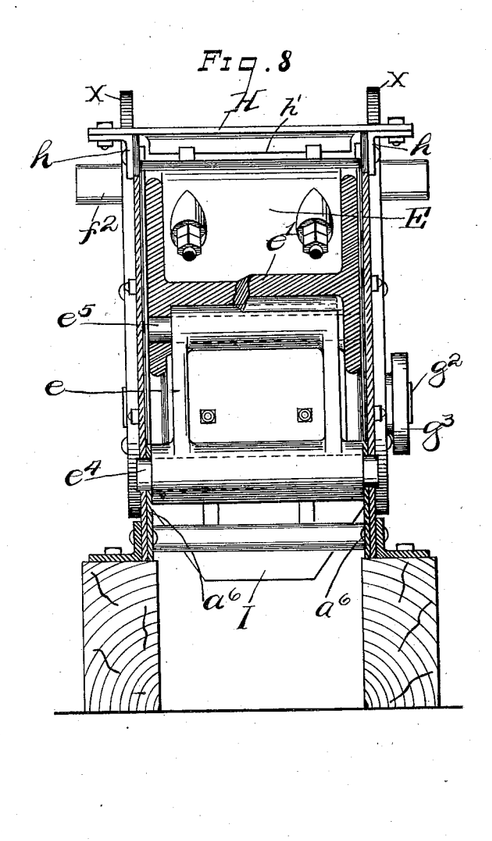
Fig. 8 is a cross-section on line Z—Z in Fig. 6.
Figure 9:
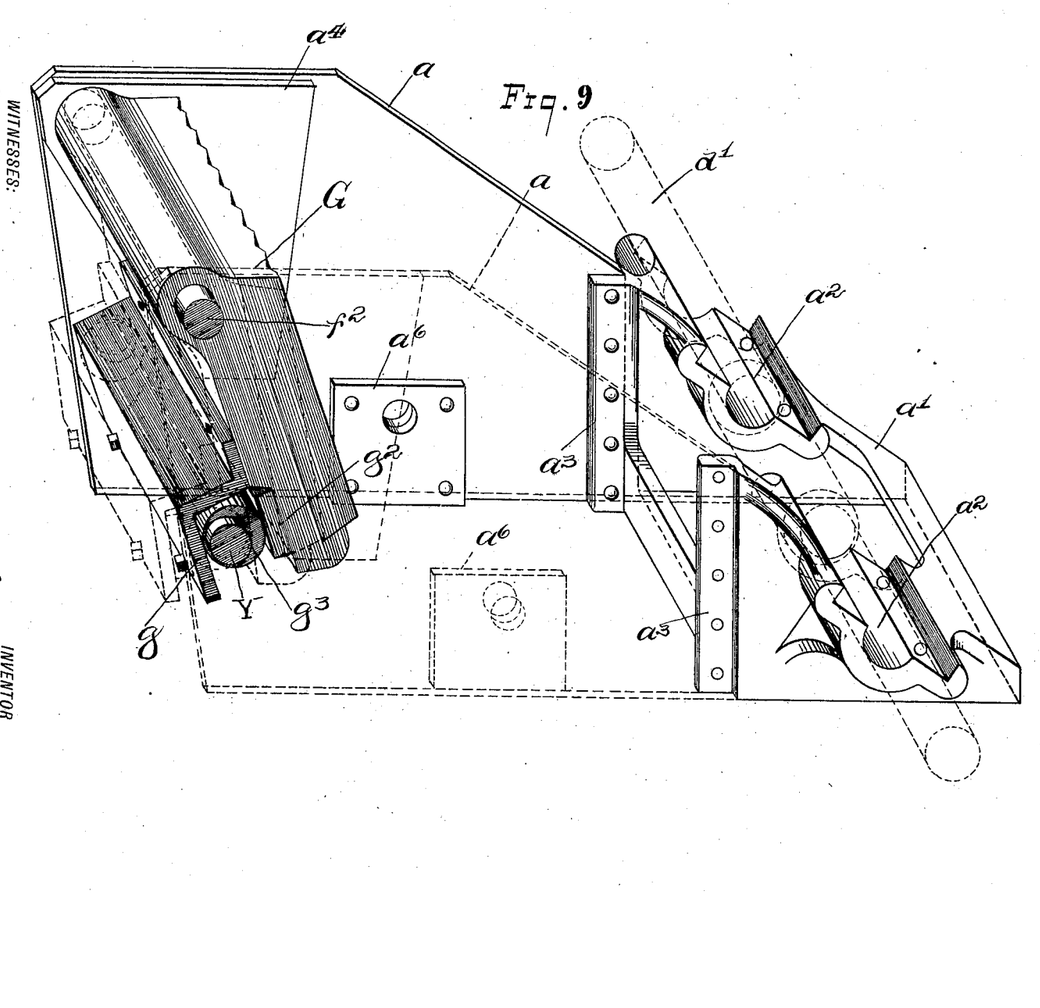
Fig. 9 is a perspective showing the movable jaw, the pitman, and the inner side of the frame removed.

Now referring more particularly to Fig. 6, and the other figures of the drawings, it will be seen that the body-frame of my improved crusher is advantageously constructed from steel plates and castings, the two steel plates $a$ constituting the rear sides of the machine, and being joined to the casting $a^1$ which constitutes the forward end of the body-frame, and which also provides the bearings $a^2$ for the eccentric shaft. As illustrated, the steel side plates $a$ of the body-frame are riveted to the vertical flanges $a^3$ of the casting $a^1$. The side plates $a$ are also preferably provided with lining plates $a^4$, which are secured thereto in any suitable or desired manner, as, for example, by bolts, $a^5$, and which constitute the cheeks or sides of the crushing hopper formed between the two jaws. In addition, the steel side plates $a$ of the body-frame are provided at their lower edges with bearing plates $a^6$, arranged as shown more clearly in Figs. 8 and 9, and adapted to provide bearings for the mounting of the link which supports the movable jaw. The frame thus constructed is simple, light, economical to manufacture, and of the requisite strength. The vertically disposed pitman or actuating lever D has its lower end mounted upon the eccentric $d$, which is mounted upon or formed integral with the shaft $d^1$, the latter being mounted in the previously described bearings $a^2$. Removable bearing blocks $d^2$, applied as shown more clearly in Fig. 3, can be secured to the bearings $a^2$, and thus employed as the means for holding the eccentric shaft in place. Said pitman D has its upper end formed with a bearing $d^3$, and is provided at a point intermediate of its ends, and preferably at a point immediately below the bearing $d^3$, with an additional bearing $d^4$. At its lower end the said pitman is formed with a bearing $d^5$, adapted to receive the eccentric $d$, the latter being held in place by a removable bearing-block $d^6$. The movable jaw E, which is supported for movement upon the vertically disposed and forwardly inclined link $e$, has its back or rear portion formed with a toggle-arm $e^1$. This toggle-arm, which is rigid with the jaw, is provided with a rounded end portion $e^2$ adapted to engage the bearing $d^4$ on the pitman. The removable plate or bearing-block $e^3$, secured to the pitman, as shown, can be employed as the means for engaging the back of the cylindric portion $e^2$, and thereby maintaining the same in constant engagement with the pitman. The link $e$ is, it will be seen, mounted at its lower end upon a rock-shaft $e^4$, the latter being supported in the previously mentioned bearing-plate $a^6$. It will also be observed that the upper end of said link $e$ is pivoted to the middle portion of the back of the jaw, this pivotal point $e^5$ being located slightly nearer the hopper than the lower pivotal point on rock-shaft $e^4$. A swinging fulcrum is provided for the pitman by arranging links or tension-rods F at each side of the machine, and by connecting these links or tension-rods at one end by means of a cylindric cross-arm $f$, the latter being held against lost motion in the bearing $d^3$ by means of gibs and set-screws $f^1$. The said links or tension-rods are connected at their other ends to a similar cylindric cross-bar $f^2$ extending through openings in the side plates of the frame. In this way, the said tension-rods and connecting cross-bars constitute a sort of yoke whereof one end is pivoted to the body frame and the other to the pitman. Consequently, when the eccentric $d$ is rotated, the pitman D is given a bodily up-and-down and a swinging or vibratory movement. At such time, the pitman acts as a lever, the power being applied at its lower end, the fulcrum being located at its upper end, and the work or weight being connected at a point intermediate of the power and fulcrum. The bodily up-and-down movement of the pitman causes the tension-rods F of the yoke to swing up and down, and also causes the rear end of the rigid toggle-arm $e^1$ to swing up and down. In addition, the lateral or back-and-forth swinging movement of the pitman cause a bodily movement of the movable jaw toward and away from the stationary jaw G. In this way, it is evident that the rotation of the eccentric is, through the medium of the pitman, the swinging yoke, and the rigid toggle-arm, converted into an oscillatory and bodily forward-and-back movement on the part of the movable crushing jaw. And owing to the fact that the three bearings or pivotal points of the pitman are all on a line, or substantially so, the bodily forward-and-back movement of the jaw is slightly less at its top than at its bottom. In this way, with this particular movement on the part of the movable crushing jaw, I obtain what I find to be a most excellent and efficient crushing action.

In order that the product may be changed at will—that is to say, in order that the size of the crushed rock after it leaves the throat of the hopper may be varied at will—the stationary jaw G is preferably mounted for pivotal or swinging movement upon the cross-bar $f^2$. This, it will be seen, permits its bottom or lower part to be swung toward or away from the movable jaw, thereby widening or narrowing the throat or discharge opening at the lower end of the hopper. This adjustment of the stationary jaw, which is preferably a swinging adjustment of its bottom or lower end toward and away from the movable jaw, can be accomplished in any suitable or desired manner. For example, and as a matter of further or special improvement, the said stationary jaw can be provided with a plate $g$ having a bearing $g^1$ adapted to oppose a similar bearing $g^2$ formed integral with a body of the stationary jaw. Between these two flat bearing surfaces, an eccentric $g^3$ can be suitably mounted and arranged so that it is always in contact at opposite sides with the said bearing surfaces. The ends of this eccentric can, as stated, be supported in bearings in the body-frame A, and one end of the eccentric can be provided with a disk $g^4$ having radially extending sockets or openings $g^5$. With this arrangement, the rotation of the said eccentric $g^3$ can be prevented by providing a weighted arm $g^6$, pivoted to the body-frame at $g^7$, and provided with a finger $g^8$ adapted to engage the sockets $g^5$. The ball or weight $g^9$ can be used as a handle, and by raising the arm thus weighted, so as to disengage its finger from the socketed disk, the eccentric can be rotated to any desired position. Such rotation on the part of the eccentric $g^3$, will, it is obvious, cause the stationary jaw G to swing toward and away from the movable jaw E, according to the extent and direction of such rotation. In this way, the jaw G is adapted for adjustment in such manner as to vary the size of the throat or discharge opening at the bottom of the hopper, so as to make the machine crush fine or coarse, as may be desired. And this feature whereby the product of the machine can be varied is, it will be seen, of such character that the necessary adjustments can be made without stopping the machine.

It is important, and it is certainly an advantage, to have the top or upper end of the hopper provided between the two jaws decked over, so to speak, by means of the cross-plates H which have their opposite ends secured to angle irons $h$, mounted upon opposite sides of the body-frame, and which have their inner edges provided with downwardly projecting lips $h^1$. In this way, the crushing hopper is practically provided with a mouth or feed-opening which does not vary in size, and which, consequently, makes it impossible for rocks or stones which are above a certain size to be placed upon and brought into contact with the tops or upper ends of the crushing jaws. In other words, the machine has the crushing hopper provided between the two jaws decked over and provided with a feed-opening which acts as a sort of gage to determine the maximum size of rock or stone to be admitted between the jaws.

As a matter of further and special improvement, the spout I, which receives the product or crushed rock from the hopper, is preferably supported to ride or slide upon the cross-bar $i$, which latter is rigid with the body-frame, and the desired agitation or bodily back-and-forth movement of this spout is obtained by hinging its rear end portion $i^1$ to the supporting link, $e$. In this way, a pivotal point of connection $i^2$ is provided between the said link and the spout whereby the operation of the machine is necessarily accompanied by an agitation or forward-and-back movement of the spout upon its rest or support $i^1$. This agitation of the hopper spout is obviously effective in preventing clogging and keeping the throat of the hopper clear.

The cross-bar or axis $f^2$, of the swinging yoke, has several functions, as (for example) it supports the adjustable jaw, supports the side-member X, and is the axis of the yoke. The curved side-members X, which support the elevator, are also supported by the end Y of the eccentrically mounted roll $g^3$.

From the foregoing, it is now obvious that I provide an improved jaw crusher which is characterized by various features tending to increase its efficiency and serviceability. With the construction shown, the machine can be run at surprisingly high speed without loosening any of the parts, and without danger of breaking. As previously stated, the relative disposition of the pivotal points on the pitman is of such character that the particular combined oscillatory and bodily forward-and-back movement of the movable jaw, obtained through the combination of the pitman, swinging yoke, and toggle-arm rigid with the jaw, is of an especially efficient character. Also, with the provision of means for adjusting the stationary jaw upon the transverse member or axis of the yoke, the product can be changed at will without stopping the machine, and without in any way altering the efficiency of the crushing action. Again, no rocks or stone above a certain size can be placed in contact with the jaws, owing to the provision of the flat-topped deck with a feed opening, and in this way danger of breakage is avoided, and the operator is enabled to know instantly whether or not a certain rock or stone is of the requisite size.

The agitation, in the manner specified, of the spout is effective in preventing clogging at the throat or discharge opening of the hopper. The product, as fast as it is discharged from the hopper, is delivered by the agitated spout to the lower end of the elevator and is then conveyed by the latter to the point desired; and with the elevator constructed as described, it is, as previously stated, very easily handled and manipulated. The body-frame of the machine, constructed as specified, is also an important feature of my invention, as it combines great strength and durability with lightness and facility of manufacture. And the supporting link, applied to the movable jaw as specified, is, as explained, an advantageous and desirable feature.

It will be seen that the yoke comprises the two side-links and the two transverse cylindric end-portions. With this arrangement, the pitman is fulcrumed on one end of the yoke, and the stationary jaw is adjustably and pivotally mounted on the other end of the yoke. In other words, the stationary jaw is swingingly mounted for swinging adjustment upon the axis end of the yoke.

It will be seen that the side members X X can be bolted to the sides of the crusher frame or body, so as to hold them flatwise upon the said sides. The side members, however, also constitute bearings for the end of the yoke and the ends of the eccentric for adjusting the stationary jaw, in the manner explained. This also serves to relieve the strain on any bolts or rivets by which the said members X X are secured to the sides of the body, because the said cylindric members are of substantial diameter and not liable to be sheared by the weight of the elevator. In other words, the bolts or rivets which extend through the members X X may be employed simply to hold the latter in place, while the cylindric end portions of the yoke and the said eccentric for adjusting the stationary jaw can be relied on to take the strain imposed thereon by the weight of the elevator.

What I claim as my invention is:—

1. A crushing machine comprising a vibratory crushing jaw, a pivoted stationary jaw, an eccentric device for pivotally adjusting the stationary jaw and thereby changing the size of the discharge opening, said eccentric device comprising an eccentrically and horizontally mounted roll interposed between and in contact with two vertically disposed and oppositely arranged surfaces carried by the said adjustable jaw, said oppositely arranged surfaces providing a chamber in which the said roll can move up and down relatively to said adjustable jaw.

2. A crushing machine comprising a movable jaw, a stationary jaw pivotally mounted at its top, an eccentric for adjusting the bottom of the stationary jaw toward and away from the other jaw, and a catch device for locking the eccentric device against rotation, said eccentric device comprising an eccentrically and horizontally mounted roll interposed between and in contact with two vertically disposed and oppositely arranged surfaces carried by the said adjustable jaw, said oppositely arranged surfaces providing a chamber in which the said roll can move up and down relatively to said adjustable jaw.

3. A crushing machine comprising a stationary jaw, a movable jaw provided with a rigid toggle-arm, a swinging yoke, and a pitman having its lower end actuated by an eccentric device and its upper end fulcrumed upon the swinging end of said yoke, said toggle-arm having a pivotal connection with the pitman at a point intermediate of its ends and on a line, or practically on a line, extending from the center of the eccentric device to the center of the said fulcrum, said line being at right angles, or substantially at right angles, to the length of said yoke, whereby the maximum of bodily movement is obtained for the movable jaw, with any given stroke and leverage for the pitman.

4. A crushing machine comprising a vertically disposed pitman having three bearings arranged in line, or practically in line, with each other, an eccentric device applied to one of said bearings, a movable crushing jaw provided with a rigid toggle-arm having its end portion applied to another of said bearings, another jaw opposing said movable jaw, and a swinging yoke having its free end portion applied to the remaining bearing on the pitman, the direction of alinement of said bearings being at right angles, or substantially at right angles, to the length of said yoke, whereby the maximum of bodily movement is obtained for the movable jaw, with any given stroke and leverage for the pitman.

5. A crushing machine comprising crushing jaws whereof one is movable, a supporting link having its lower end suitably mounted and its upper end pivotally connected with the back of said movable jaw at a point substantially midway between the top and bottom thereof, a vertically disposed pitman engaging a rigid portion of said movable jaw, an eccentric for operating said pitman, and a swinging yoke having its vibrating end employed as a fulcrum for said pitman, together with means applied to the pitman for holding a rigid portion of said movable jaw in pivotal connection or engagement with said pitman, whereby the movable jaw is rocked upon the upper end of said link, when the pitman vibrates the said yoke, and the movable jaw and link are actuated positively in all of the directions of their motion by that portion of the pitman above the eccentric device.

6. A crushing machine comprising a crushing hopper composed of movable and stationary jaws, a pitman having a hinge-like or pivotal engagement with a portion rigid with the movable jaw, a swinging yoke upon one end of which said pitman is fulcrumed and upon the other end of which said stationary jaw is mounted for adjustment toward and away from the movable jaw, and means for thus adjusting the stationary jaw for the purpose of changing the size of the hopper-throat and thereby varying the size of the product, together with an eccentric device for actuating the said pitman up and down and thereby operating said movable jaw and vibrating said yoke about an axis coincident with the axis about which said stationary jaw is adjusted, the yoke embracing the jaws.

7. A crushing machine comprising a movable jaw, a stationary jaw, a suitably actuated pitman for operating the movable jaw, a swinging yoke upon the up-and-down swinging end of which said pitman is fulcrumed and upon the stationary end of which said stationary jaw is mounted, stationary bearings for the jaw-end of said yoke, means for adjusting the stationary jaw toward and away from the movable jaw, and an eccentric device for actuating the said pitman up and down and thereby operating said movable jaw and vibrating said yoke about an axis coincident with the axis about which said stationary jaw is adjusted, the sides and ends of the yoke embracing both of the jaws, said movable jaw disposed between the pitman and the stationary jaw.

8. A crushing machine comprising a crushing hopper formed in part by a stationary crushing jaw, a pitman having a hinge-like or pivotal engagement with a portion rigid with the movable jaw, a swinging yoke upon the up-and-down swinging end of which said pitman is fulcrumed and upon the other end of which said stationary jaw is hung for swinging adjustment in such manner as to change the size of the discharge opening at the bottom of the hopper, stationary bearings for the jaw-end of said yoke, means for thus adjusting the stationary jaw, and an eccentric device for actuating the said pitman up and down and thereby operating said movable jaw and vibrating said yoke about an axis coincident with the axis about which said stationary jaw is adjusted, the yoke embracing both of the jaws, said movable jaw disposed between the pitman and the stationary jaw.

9. A crushing machine comprising a crushing hopper formed in part by a pivotally mounted stationary jaw, a pitman having a hinge-like or pivotal engagement with a portion rigid with the movable jaw, a swinging yoke upon one end of which said pitman is fulcrumed and upon the other end of which said stationary jaw is mounted, and adjusting means for swinging the jaw upon the transverse end member of the yoke and thereby changing the size of the desired opening of said hopper, together with an eccentric device for actuating the said pitman up and down and thereby operating said movable jaw and vibrating said yoke about an axis coincident with the axis about which said stationary jaw is adjusted.

10. A crushing machine comprising a movable crushing jaw, means including a swinging yoke for operating said jaw, a stationary crushing jaw pivoted at its top upon a transverse end member or axis of said yoke, stationary bearings for said end member or axis, and means for swinging the bottom of the stationary jaw toward and away from the movable jaw for the purpose of changing the size of the discharge opening, both of said jaws being arranged intermediate of the ends of the yoke and between the sides thereof, said movable jaw disposed between the stationary jaw and the said end member or axis of the yoke.

11. A crushing machine comprising stationary and movable crushing jaws forming a hopper between them, a stationary flat-topped deck secured over said hopper and provided with a feed-opening of a character to prevent rocks or stones above a certain size from entering the hopper, a body-frame having outer parallel angle-iron side portions to the top surfaces of which said deck is secured, said deck consisting of two transverse strips the inner or opposing edges of which are provided with downwardly extending lips or flanges located just above the upper edges of the crushing faces of said jaws, one strip covering the upper end of the movable jaw and the other strip covering the top of the stationary jaw, and side plates to which said angle-iron side portions are secured.

12. A crushing machine comprising a crushing hopper formed in part by a movable crushing jaw, a supporting link having its lower end suitably mounted and its upper end connected with the said movable jaw, a pitman for actuating said movable jaw, a suitable fulcrum for said pitman, and an eccentric device for operating the said pitman, together with means applied to the pitman for holding the rear end of a rigid portion of said movable jaw in pivotal connection or engagement with said pitman, whereby the movable jaw swings relatively to the pitman and is rocked upon the upper end of said link, when the pitman vibrates about its said fulcrum, and the movable jaw and link are actuated positively in all of the directions of their motion by that portion of the pitman above the eccentric device, through the medium of the toggle joint between the pitman and movable jaw.

13. A crushing machine comprising a crushing hopper formed in part by a movable crushing jaw, a supporting link having its lower end suitably supported and its upper end pivotally connected with said jaw, and a movable spout adapted to receive the product from the throat of said hopper and having its rear end pivotally connected with said link, together with a pitman having a toggle joint connection or engagement with said jaw, and an eccentric device for actuating said pitman, whereby the vibratory motion communicated from the pitman through the said toggle joint to the link is converted into an endwise reciprocation on the part of said spout, and the said link has the double function of supporting the jaw and shaking the said spout.

14. A crushing machine comprising a body-frame composed of an end casting adapted to provide a couple of bearings, and a couple of side plates connected by and suitably secured to said casting, movable and stationary jaws mounted to oppose each other between said side plates, an eccentric suitably mounted in the bearings of said casting, a pitman actuated by said eccentric and engaging a rigid portion of the movable jaw, a suitable fulcrum for said pitman, and tension rods arranged just outside of said plate and connecting said fulcrum with the frame, said side plates consisting of two separate and vertically disposed metal walls having their ends in one direction rigidly connected together solely by said casting, a cylindric member extending through the other ends of said walls, and links connecting said member with said fulcrum.

15. A crushing machine comprising movable and stationary jaws, means including a pitman for producing relative movement between said jaws, and a body-frame suitably supporting the jaws and other operating parts and composed of an end casting and a couple of flat steel side plates, said side plates being rigidly connected by and secured to said casting, and a pair of removable bearing blocks secured to said casting, together with a shaft included in said means and held in place upon said casting by said blocks, a cylindric member extending through said plates, and links connecting said member with said pitman, said links being disposed just outside of said plates.

16. A crushing machine comprising a suitable crushing jaw, means including a swinging yoke for operating the jaw to produce the crushing action, a spout adapted to receive the product, a couple of side members mounted on the transverse end member of said yoke, and an elevator mounted on said side members.

17. A crushing machine comprising a frame, a pair of jaws, one stationary and the other movable, transverse members supporting the stationary jaw and having their ends projecting beyond the sides of the frame, means for operating the movable jaw, said means including side links whose ends are pivotally connected to the upper one of said transverse members, side members supported on the projecting ends of said transverse members, and an elevator supported on said side members.

18. In a machine of the character described, means including a swinging yoke for producing the crushing action, an elevator, means by which said elevator is connected with and supported by one transverse horizontal end member of said yoke, and a stationary bearing for said end member.

19. A crushing machine comprising a pair of steel side plates, a pair of lining plates secured to the inner surfaces of said side plates, a crushing hopper formed in part by a movable jaw mounted between said lining plates, a separately formed end casting secured to and connecting the said side plates and so formed as to provide a couple of bearings, and means for operating the movable jaw, said means including a pitman and eccentric device mounted in said bearings, said side plates consisting of two separate and vertically disposed metal walls having their ends in one direction rigidly connected together solely by said casting, a cylindric member extending through the side plates, and links connecting the said member with the pitman, said links disposed just outside of said side plates.

20. A crushing machine comprising a pitman and movable jaw, a body-frame composed of a couple of parallel side plates, lining plates removably secured to the inner surfaces of said side plates, and a separately formed end casting secured to and connecting the ends of said side plates and extending transversely across the machine, said side plates consisting of two separately and vertically disposed metal walls having their ends in one direction rigidly connected together solely by said casting, a cylindric member extending through the side plates, and links connecting the said member with the pitman, said links disposed just outside of said side plates.

Signed by me at Chicago, Cook county, Illinois, this 16th day of May, 1904.

THOMAS J. GRAY.

Witnesses:
 SEVERINUS B. CHABOWSKI,
 WM. A. HARDENS.